US006760859B1

United States Patent
Kim et al.

(10) Patent No.: US 6,760,859 B1
(45) Date of Patent: Jul. 6, 2004

(54) FAULT TOLERANT LOCAL AREA NETWORK CONNECTIVITY

(75) Inventors: Moon J. Kim, Wappingers Falls, NY (US); William G. White, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/576,301

(22) Filed: May 23, 2000

(51) Int. Cl.[7] ............................................. G06F 11/00
(52) U.S. Cl. ........................................ 714/4; 370/217
(58) Field of Search ........................ 714/4; 709/221; 370/217, 221

(56) References Cited

U.S. PATENT DOCUMENTS

| | | | |
|---|---|---|---|
| 5,329,521 A | * 7/1994 | Walsh et al. | 370/225 |
| 5,341,363 A | 8/1994 | Hirasawa | 370/13 |
| 5,455,932 A | 10/1995 | Major et al. | 395/489 |
| 5,473,771 A | 12/1995 | Burd et al. | 395/182.02 |
| 5,774,640 A | * 6/1998 | Kurio | 714/4 |
| 5,781,715 A | 7/1998 | Sheu | 395/182.02 |
| 5,781,716 A | 7/1998 | Hemphill et al. | 395/182.02 |
| 5,835,481 A | 11/1998 | Akyol et al. | 370/216 |
| 5,848,227 A | 12/1998 | Sheu | 395/182.02 |
| 5,974,562 A | * 10/1999 | Townsend et al. | 714/4 |
| 6,049,825 A | * 4/2000 | Yamamoto | 709/221 |
| 6,052,733 A | * 4/2000 | Mahalingam et al. | 709/235 |
| 6,108,300 A | * 8/2000 | Coile et al. | 370/217 |
| 6,208,616 B1 | * 3/2001 | Mahalingam et al. | 370/216 |
| 6,314,525 B1 | * 11/2001 | Mahalingam et al. | 714/4 |

FOREIGN PATENT DOCUMENTS

| | | | |
|---|---|---|---|
| WO | WO 92/18931 | 10/1992 | G06F/11/20 |
| WO | WO 99/33227 | 7/1999 | H04L/12/28 |

OTHER PUBLICATIONS

IBM Technical Disclosure Bulletin, "Hardware Fault Tolerant 3745 Communication Controller—a Major Step to a Non–Disruptive Network Switching," vol. 35, No. 5, Oct., 1992, pp. 95–96.

IBM Technical Disclosure Bulletin, "Fault–Tolerant Architecture for Communication Adapters and Systems," vol. 35, No. 7, Dec., 1992, pp. 300–303.

IBM Technical Disclosure Bulletin, "Local Area Network Back–up Service," vol. 38, No. 02, Feb. 1995, pp. 29–31.

* cited by examiner

Primary Examiner—Robert Beausoliel
Assistant Examiner—Christopher S. McCarthy
(74) Attorney, Agent, or Firm—Floyd A. Gonzalez; Lily Neff

(57) ABSTRACT

Method, program product, and apparatus for providing a nondisruptive takeover by a backup adapter when an adapter from a group of adapters connecting a data processing system to a Local Area Network (LAN) fails. The adapters are arranged in one or more groups, with each group having at least two members, one member being a backup adapter in the idle state. Primitives, in accordance with the IEEE 802.2 standard, are monitored for each adapter, and when a failure is detected, the Medium Access Control (MAC) address for that adapter is loaded in the backup adapter, and the backup adapter is placed in the active state to nondisruptively takeover for the failed adapter.

4 Claims, 2 Drawing Sheets

FAULT TOLERANT LOCAL AREA NETWORK CONNECTIVITY

The present invention relates to recovering from a fault in the connectivity of a data processing system to a local area network (LAN), and more particularity relates to providing recovery of connectivity to a LAN in the event of the failure of one of a group of LAN adapters which connect a data processing system to a LAN.

BACKGROUND OF THE INVENTION

High availability requirements for networks are usually the most stringent within an Internet environment. These requirements are for the most part met through a high degree of redundancy and complexity. The LAN environment is no exception. Servers are physically isolated from clients using separate LANs and multiple LAN attachments creating an extra layer of complexity. This is all due to the make up of the LAN protocols which impose a unique MAC__address restriction to each attached station on a given LAN.

For SNA traffic, bridges with MAC__address filtering are used. With TCP/IP traffic, an IP router and a dynamic routing protocol (i.e., RIP or OSPF) are used to mask MAC__ addresses by directing traffic via virtual IP__addresses. Both solutions are designed to provide a single access point and nondisruptive connectivity.

U.S. Pat. No. 5,341,363, issued Aug. 23, 1994, to Hirasawa for COMPUTER SYSTEM CAPABLE OF DISCONNECTING ITSELF FROM A LAN, discloses a logical connecting/disconnecting section for logically disconnecting a computer system from the LAN in response to the detection of the failure at a failure detection section.

U.S. Pat. No. 5,455, 932, issued Oct. 3, 1995, to Major et al. for FAULT TOLERANT COMPUTER SYSTEM, discloses a method and apparatus for providing a fault-tolerant backup system such that if there is a failure of a primary processing system, a replicated system can take over without interruption.

U.S. Pat. No. 5,473,771, issued Dec. 5, 1995, to Burd et al. for FAULT-TOLERANT PROCESSING SYSTEM ARCHITECTURE, discloses a fault-tolerant call-processing adjunct processor comprising a redundant, duplicated, service unit provisioning and maintenance processor, a duplicated LAN connected to both service units, and a plurality of served units, each connected to both LANs.

U.S. Pat. No. 5,781,715, issued Jul. 14, 1998, to Sheu for FAULT-TOLERANT BRIDGE/ROUTER WITH A DISTRIBUTED SWITCH-OVER MECHANISM, and U.S. Pat. No. 5,848,227, issued Dec. 8, 1998, to Sheu for METHOD OF PROVIDING FAULT TOLERANCE AND SWITCH-OVER DISTRIBUTION IN A BRIDGE/ROUTER, disclose a fault-tolerant router for providing the prevention of packet loss so that a source station does not have to resend lost packets blocked due to a failed processing element and provide transparency to end stations so that the packet recovery is independent of the networking protocols implemented.

U.S. Pat. No. 5,781,716, issued Jul. 14, 1998, to Hemphill et al. for FAULT TOLERANT MULTIPLE NETWORK SERVERS, discloses a fault tolerant multiple network server system in which multiple servers concurrently act as back-up servers for each other even while they are providing their own server services to the system, rather than having an unused server monitoring for failure of a primary server and taking over control.

U.S. Pat. No. 5,835,481, issued Nov. 10, 1998, to Akyol et al. for FAULT TOLERANT LANE SYSTEM, discloses an ATM network having a set of LAN emulation connection servers which connect with each other to determine which servers are operational and to automatically select an operational master server. Servers which lose their connection are directed to the proper server by a table stored in the ATM switch.

PCT Application WO 92/18931, published Oct. 29, 1992, for Eastman Kodak Company for FAULT TOLERANT NETWORK FILE SYSTEM, discloses a fault tolerant network fileserver system including a plurality of nodes connected to a network communication link. A primary fileserver node stores files from a plurality of the nodes and a backup fileserver node stores copies of files from the primary fileserver. The primary and backup fileservers are connected to a dual ported memory for communicating information between the fileservers.

PCT application WO 99/33227, published Jul. 1, 1999, for Holontech Corporation for CROSS-PLATFORM SERVER CLUSTERING USING A NETWORK FLOW SWITCH, discloses a network flow switch for connecting a pool of IP routers to a cluster of IP servers sharing a single IP address without requiring translation of the IP address. All IP servers have the same IP address.

IBM Technical Disclosure Bulletin, Vol. 35 No. 5 October 1992, pages 95–96, for HARDWARE FAULT TOLERANT 3745 COMMUNICATION CONTROLLER —A MAJOR STEP TO A NON-DISRUPTIVE NETWORK SWITCHING, discloses a fault tolerance on the 3745 engine having a mode wherein the content of the two CCUs will be exactly identical and the backup one may continue the task if the active one fails.

IBM Technical Disclosure Bulletin, Vol. 35 No. 7 December 1992, pages 300–303, for FAULT-TOLERANT ARCHITECTURE FOR COMMUNICATION ADAPTERS AND SYSTEMS, discloses fault-tolerant adapters with multiple network interface modules to overcome failures at the interface level and with software memory management support to overcome failures of the hardware memory manager. Redundant adapters are used to overcome permanent failures of an adapter's processor subsystem.

IBM Technical Disclosure Bulletin, Vol. 38 No. 02 February 1995, pages 29–31, for LOCAL AREA NETWORK BACK-UP SERVICE, discloses a hardware and software implementation to provide a back-up server for LAN operations as used with personal computers. The back-up server is designed to monitor the activities of a domain controller and assumes the identity of the domain controller when a failure is detected.

SUMMARY OF THE INVENTION

It is a primary object of the present invention to provide for the nondisruptive takeover of a failing or failed LAN adapter by a backup adapter in a data processing system connected to a LAN.

It is another object of the present invention to provide for an apparatus which provides for the nondisruptive takeover of a failing or failed LAN adapter by a backup adapter in a data processing system connected to a LAN.

It is another object of the present invention to provide for a program product for providing for the nondisruptive takeover of a failing or failed LAN adapter by a backup adapter in a data processing system connected to a LAN.

It is another object of the present invention to provide for placing the MAC__address of a failed LAN adapter into a backup LAN adapter upon the detection of the failure of the failed adapter such that the backup LAN adapter may nondisruptively take over for the failed adapter.

These and other objects will be apparent to one skilled in the art from the following drawings and detailed description of the invention.

DESCRIPTION OF THE PREFERRED EMBODIMENT

Figure 1:
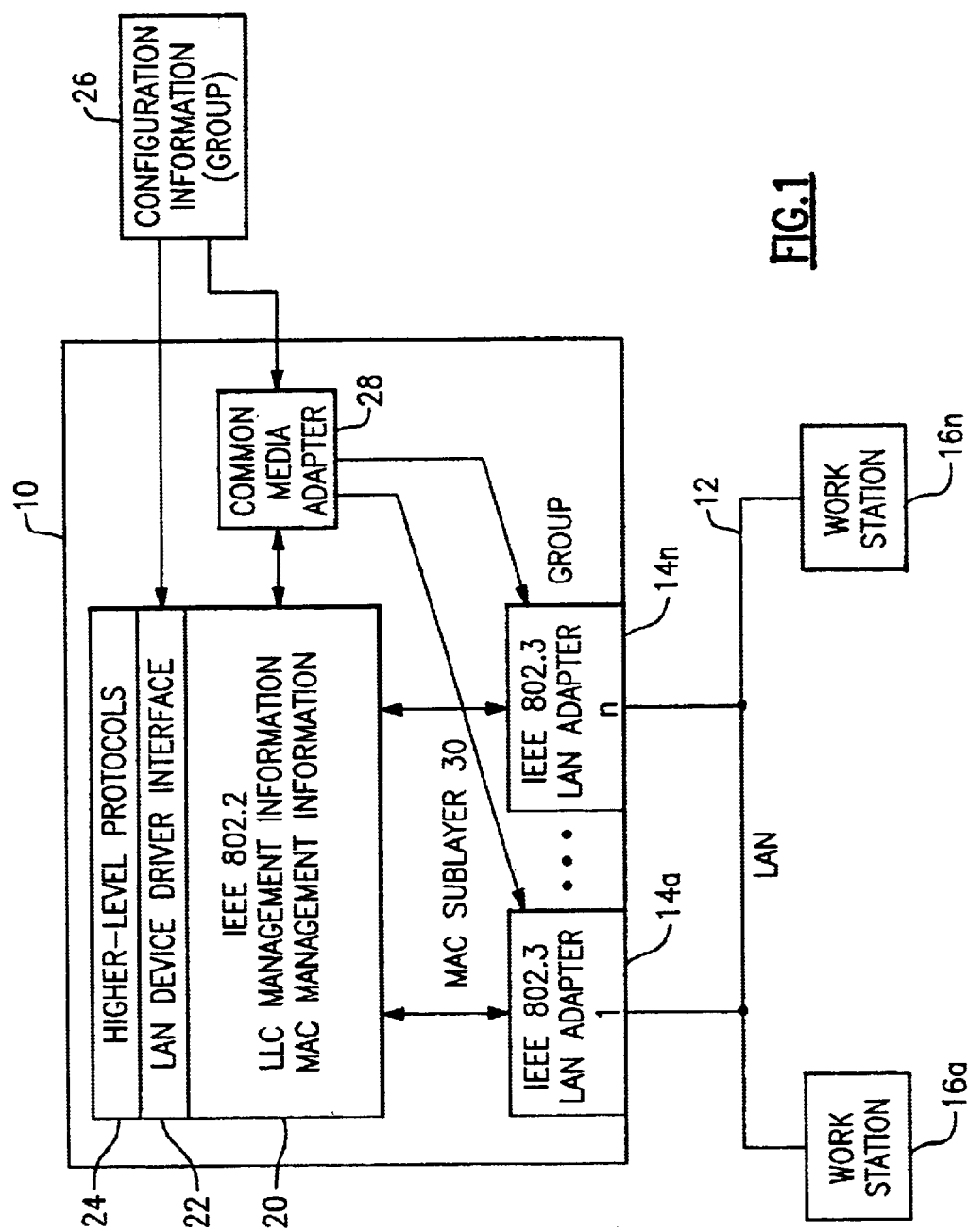
FIG. 1 is a diagrammatic representation of a data processing system such as a server having a common media adapter of the present invention.

FIG. 1 shows a data processing system 10 acting as a LAN server, such as, for instance, a S/390 system available from International Business Machines of Armonk, N.Y. The server 10 is connected to a Local Area Network (LAN) 12 by a number of LAN Adapters 14a–14n and acts to pass messages between the server 10 and LAN work stations 16a–16n and further, for passing messages between the work stations 16a–16n, as is well known in the art. The document 802-1990 "IEEE Standards for Local and Metropolitan Area Networks: Overview and Architecture Description," available from the Institute of Electrical and Electronic Engineers (IEEE) is the foundation document for the series of IEEE 802 LAN MAN standards and contains key concepts, descriptions of the networks, as well as a reference model for protocol standards for the architecture usable with the present invention.

The server 10 is connected to the LAN adapters 14a–14n, which are controlled in accordance with the IEEE standard 802.2 Information technology—Telecommunications and information exchange between systems—Local and Metropolitan area networks—Specific requirements—Part 2: Logical link control, also available from the Institute of Electrical and Electronic Engineers. The IEEE 802.2 Data Link Control (DLC) 20 is above the LAN adapters, and is below the LAN device driver interface layer 22, which is below the higher-level protocols layer 24. The LAN adapters 14a–14n are architected in accordance with IEEE 802.3 Information technology—Telecommunications and information exchange between systems—Local and metropolitan area networks—Specific requirements—Part 3: Carrier sense multiple access with collision detection (CSMA/CD) access method and physical layer specifications, also available from the Institute of Electrical and Electronic Engineers. The DLC 20 layer includes logical link control (LLC) information and medium access control (MAC) management information which is used by the IEEE 802.3 LAN adapters 14a–14n to connect the server 10 to the LAN 12 and to be addressable by the work stations 16a–16n. The DLC layer 20 is separated from the IEEE 802.3 layer (Adapters 14a–14n) allowing the LCC information to be shared among the multiple LAN connections, allowing the takeover process to be nondisruptive.

Memory 26 is provided which contains configuration information and an identification of one or more groups of LAN adapters. A group of LAN adapters has at least two members, an active adapter and a backup adapter. If the active adapter fails, a takeover process, to be discussed, is provided to have the backup adapter takeover the function of the active adapter. The present invention may have several groups, with each group having at least one backup adapter to takeover for a member of the group in the event that that member fails. Initially, the configuration information in memory 26 is given to the LAN device driver interface layer 22. A Common Media Adapter (CMA) 28 also loads the MAC-address through the MAC sublayer 30 into the active members of the adapter group to allow data to be picked up off the LAN 12 from the LAN adapters. The backup adapter in the LAN adapter group is initially in the idle state. All other LLC connection information will be kept and updated in the CMA 28. The CMA 28 is also responsible for monitoring the physical connection and invoking the takeover process, as well as passing the data to the higher-level protocols such as System Network Architecture (SNA) and Transmission Control Protocol/Internet Protocol (TCP/IP), as is well understood.

For a backup adapter in a LAN station to takeover a failing adapter's connection in a nondisruptive manner, access to the LLC information must be available. Without it, there will be a synchronizing problem between the IEEE 802 layers and the higher-level protocols (SNA and TCP/IP), hence causing the connection to be disrupted. The same MAC_address must also be used to receive and transmit frames to provide a single access point on the LAN.

The IEEE 802.2 standard describes the top sublayer of the Data Link Control (DLC) layer 20 (OSI model). It is common to all MAC sublayers defined by IEEE. This means higher-level protocols are shielded from the peculiarities of the physical medium and specific medium access protocols being used. A management function at the DLC layer is responsible for managing the control of information between both the LLC and MAC layers.

In FIG. 1, the LAN adapters 14a–14n are attached to the same physical LAN: all members of the group except the backup adapter are in an active state, while the backup adapter is in an idle state. When an active LAN adapter fails or loses connectivity to the LAN, then the backup or idle LAN adapter is activated and loaded with the same MAC_address as the failing, active LAN adapter. This is achieved through the use of the LLC and MAC information of the LAN adapters that are grouped together. The grouping of LAN adapters and defining of a MAC_address that is loaded into the LAN adapters is done via a configuration utility that interfaces with the LAN device drive 22.

The LLC and MAC information is controlled and managed by the CMA 28. CMA 28 is also responsible for monitoring the physical connection by use of the MAC Service Primitives and invoking the takeover process by loading the MAC_address into the idle backup LAN adapter (using the binding process). The CMA 28 is also responsible for passing the data to the higher-level protocols.

The MAC service primitives are given at page 101 of the IBM publication GG24-3178 "Local Area Networks Concepts and Products." The service primitives are:

Medium Access Data Request (MA_DATA.request)

This primitive is generated whenever the LLC sublayer has data to be transmitted to another station(s) on the LAN. The MAC sublayer formats it in a MAC frame and transmits it.

Medium Access Data Confirm (MA_DATA.confirm)

This primitive is generated by the MAC sublayer in response to "MA_DATA.request" from the local LLC sublayer. A status parameter is used to indicate the outcome of the associated MA_DATA.request.

Medium Access Data Indicate (MA_DATA.indicate)

This primitive is sent to indicate that a valid frame arrived at the local MAC layer.

The frame was transmitted without errors and was correctly addressed.

Medium Address Data Response (MA_DATA.response)

This primitive is used as a response to MA_DATA.indicate.

In addition, adapter interfaces keep track of packets and connections in conjunction with configuration data, as discussed at page 194 of the aforementioned IBM publication GG24-3178.

Figure 2:
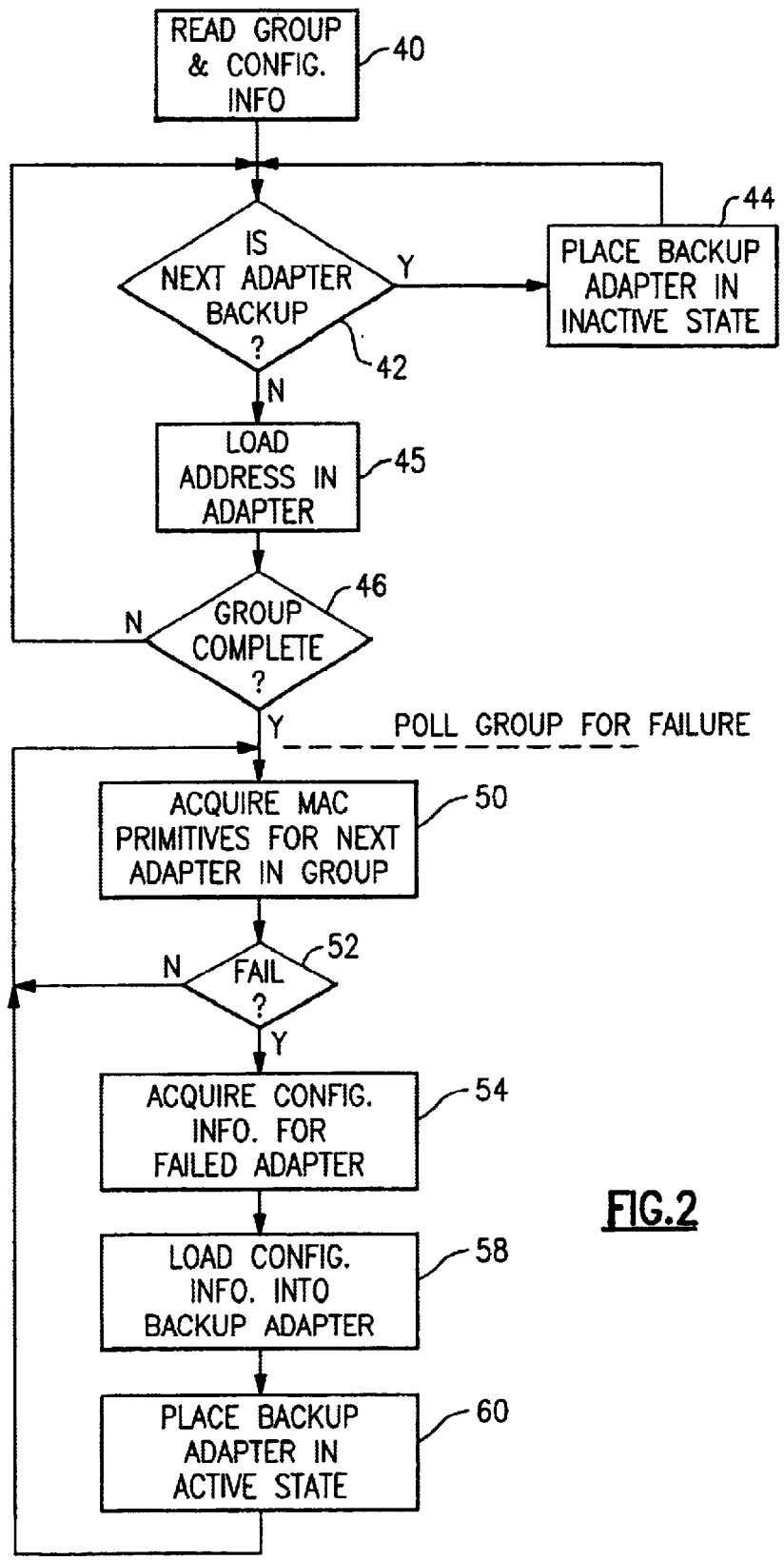
FIG. 2 is a flow chart of computer software for the nondisruptive takeover of a failed LAN adapter by a backup adapter as controlled by the common media adapter of the present invention.

FIG. 2 is a flowchart of the takeover process of the CMA 28. At 40, the CMA 28 reads the group data and configuration from memory 26. Thereafter, a loop is started to load the MAC_address into the LAN adapters 14a–14n in the group specified in the group data. At 42 a check is made to see if the next adapter is designated as the backup adapter. If it is, the backup adapter is placed in the inactive or idle state at 44. If not, the MAC_address is loaded into the adapter, and a check is made at 46 to see if the group is complete. After all of the MAC_addresses have been loaded into the active adapters of the group, the CMA 28 begins to poll the MAC primitives from the MAC management information of the DLC layer 20 to detect the failure of an adapter in the group.

At 50, the MAC primitives for the next adapter in the group, starting with the first active member of the group, is acquired. A check is made at 52 to determine if a failure of that adapter has occurred. If not, the program returns to 50 to acquire the MAC primitives for the next adapter. If a failure is detected at 52, the program acquires the configuration information for the failing or failed adapter at 54, and the MAC_address of the failed adapter is loaded into the backup adapter at 56. At 60, the backup adapter is placed in the active state to complete the nondisruptive takeover of the LAN connection by the backup adapter.

It will be understood that the adapters 14a–14n may be divided into more than one group and that each group will have at least one backup adapter, depending on the failure experience of the adapters, as desired.

While the preferred embodiment of the invention has been illustrated and described herein, it is to be understood that the invention is not limited to the precise construction herein disclosed, and the right is reserved to all change& and modifications coming within the scope of the invention as defined in the appended claims.

What is claimed is:

1. A method for providing for recovery from a fault in one of a group of adapters connecting a data processing system to a local area network, said method comprising:

establishing a group of adapters connecting the data processing system to the local area network, said group having at least two members, wherein one of the members is a backup adapter;

storing in memory, parameters including an address for each member of the group of adapters except for the backup adapter;

placing said backup adapter in the idle state wherein said backup adapter does not receive or send data;

monitoring primitives of a common media adapter having lower layers and an upper-level protocol shielded from said lower layers, said common media adapter managing each adapter for detecting when one of the adapters in the group of adapters has failed, said primitives being generated by lower layers of the common media adapter during the operation of sending data between the data processing system and the local area network; and in the event a failure is detected, recovering from the memory, the address of the failed adapter, placing the recovered address in the backup adapter as the address of the backup adapter, and placing said backup adapter in the active state, whereby said backup adapter replaces the failed adapter in a nondisruptive takeover.

2. A computer program product comprising a computer usable medium having computer readable program code means therein for use in recovering from a fault in one of a group of adapters connecting a data processing system to a local area network, said computer readable program code means in said computer program product comprising:

computer readable program code means for establishing a group of adapters connecting the data processing system to the local area network, said group having at least two members, wherein one of the members is a backup adapter;

computer readable program code means for storing in memory, parameters including an address for each member of the group of adapters except for the backup adapter;

computer readable program code means for placing said backup adapter in the idle state wherein said backup adapter does not receive or send data;

computer readable program code means for monitoring primitives of a common media adapter having lower layers and an upper-level Protocol shielded from said lower layers, said common media adapter managing each adapter for detecting when one of the adapters in the group of adapters has failed, said primitives being generated by lower layers of the common media adapter during the operation of sending data between the data processing system and the local area network; and computer readable program code means for, in the event a failure is detected, recovering from the memory, the address of the failed adapter, placing the recovered address in the backup adapter as the address of the backup adapter, and placing said backup adapter in the active state, whereby said backup adapter replaces the failed adapter in a nondisruptive takeover.

3. Apparatus for providing for recovery from a fault in one of a group of adapters connecting a data processing system to a local area network, said apparatus comprising:

means for establishing a group of adapters connecting the data processing system to the local area network, said group having at least two members, wherein one of the members is a backup adapter;

a memory in which are stored parameters including an address for each member of the group of adapters except for the backup adapter;

means for placing said backup adapter in the idle state wherein said backup adapter does not receive or send data;

a common media adapter having lower layers and an upper-level protocol shielded from said lower layers, said common media adapter managing said adapters in the sending of data between said data processing system and said local area network;

means for monitoring primitives of each adapter for detecting when one of the adapters in the group of adapters has failed, said primitives being generated by lower layers of the common media adapter during the operation of sending data between the data processing system and the local area network; and means for recovering in the event a failure is detected, said means for recovering including;

means for recovering from said memory the address of the failed adapter, means for placing the recovered address in the backup adapter as the address of the backup adapter, and means for placing said backup adapter in the active state, whereby said backup adapter replaces the failed adapter in a nondisruptive takeover.

4. Apparatus for providing for recovery from a fault in one of a group of adapters connecting a data processing system to a local area network, said apparatus comprising:

a group of adapters connecting the data processing system to the local area network, said group having at least two members, wherein one of the members is a backup adapter which is in the idle state wherein said backup adapter does not receive or send data;

a memory in which are stored parameters including an address for each member of the group of adapters except for the backup adapter;

storage area in the data processing system wherein primitives for each adapter are kept indicating when one of the adapters in the group of adapters has failed; and a common media adapter in said data processing system for recovering in the event a failure is detected, said common media adapter including; computer readable program code for generating said primitives during the operation of sending data between the data processing system and the local area network, computer readable program code for recovering from said memory the address of the failed adapter, computer readable program code for placing the recovered address in the backup adapter as the address of the backup adapter, and computer readable program code for placing said backup adapter in the active state, whereby said backup adapter replaces the failed adapter in a nondisruptive takeover.

* * * * *